United States Patent [19]

Abe et al.

[11] 3,763,000

[45] Oct. 2, 1973

[54] ENZYMATIC PRODUCTION OF CEPHALEXIN

[75] Inventors: Jinnosuke Abe, Shizuoka; Tetsuo Watanabe, Yokohama; Tsutomu Yamaguchi, Shizuoka; Tadashiro Fujii, Shizuoka; Kunio Matsumoto, Shizuoka; Yuzo Shibuya, Shizuoka; Kazumi Hanamitsu, Shizuoka, all of Japan

[73] Assignee: Toyo Jozo Kabushiki Kaisha, Shizuoka-ken, Japan

[22] Filed: Aug. 21, 1972

[21] Appl. No.: 282,104

[30] Foreign Application Priority Data
Aug. 20, 1971 Japan.............................. 46/63715

[52] U.S. Cl.................................... 195/29, 195/30

[51] Int. Cl............................................... C12d 9/00
[58] Field of Search........................... 195/29, 36 R

[56] References Cited
UNITED STATES PATENTS

| | | | |
|---|---|---|---|
| 3,522,250 | 7/1970 | Kerwin et al...................... | 195/36 R |
| 3,507,861 | 4/1970 | Morin et al....................... | 195/36 P |

*Primary Examiner*—Alvin E. Tanenholtz
*Attorney*—Irvin S. Thompson et al.

[57] ABSTRACT

Cephalexin is produced from 7-amino desacetoxy cephalosporanic acid and phenylglycine ester by enzymatic acylation with acylating enzyme derived from a microorganism selected from the group consisting of genus *Alcaligenes*, genus *Achromobacter*, genus *Flavobacter*, genus *Bacillus* and genus *Beneckea*.

9 Claims, No Drawings

ENZYMATIC PRODUCTION OF CEPHALEXIN

This invention relates to a process for production of cephalexin, that is, 7-(D-α-aminophenylacetamide)-desacetoxy cephalosporanic acid, by enzymatic acylation of 7-amino desacetoxy cephalosporanic acid (hereinafter designated 7-ADCA). More particularly this invention relates to the enzymatic process for production of cephalexin in which 7-ADCA is reacted with D-phenylglycine or a derivative thereof in the presence of the acylating enzyme preparation derived from a microorganism strain, which produces an amino group acylating enzyme for 7-ADCA, selected from the group consisting of genus *Alcaligenes*, genus *Achromobacter*, genus *Flavobacterium*, genus *Bacillus* and genus *Beneckea* in an aqueous medium. The acylating enzyme preparations hereinafter referred to include cultured broth, bacterial cells, treated bacterial cells, enzyme extracts, solid phase enzyme preparations or insoluble enzyme preparations of the said microorganism, or the like.

Heretofore, cephalexin has been produced by the processes of deacetoxycation of 7-(D-α-amino phenylacetamide)-cephalosporanic acid by catalytic hydrogenation (Dutch Patent No. 67.04294 laid open to the public in 1968); ring expansion of 6-(D-α-substituted-amino-phenylacetamide)-penicillanic acid-sulphoxide ester by heating in the presence of catalyzer and xylene (Dutch Patent No. 67.04294, 1968); or acylation of 7-ADCA by D-α-substituted amino-phenyl acetic acid, followed by removal of the protective group thereafter (Dutch Patent No. 69.05073, 1969).

These prior art methods have, however, disadvantages. For example, the acylation of 7-ADCA must be performed by using the amino group protected phenylglycine, after which the protective group is removed. This is uneconomical.

Certain of the present inventors had previously found the acylating process for producing cephalexin directly from 7-phenylacetamide-3-methyl-Δ³-cephem-4-carboxylic acid, which is a ring expansion product of penicillin G, using an enzyme preparation derived from *Bacillus megaterium*, as disclosed in copending application Ser. No. 238,517, filed Mar. 27, 1972. However, that process is not always industrially advantageous due to the low yield of cephalexin.

Therefore, it is an object of the present invention to provide an enzymatic process for the production of chemotherapeutically useful cephalexin from 7-ADCA.

Another object of the present invention is to provide an industrially attractive process for the production of cephalexin.

A further object of the present invention is to provide a process for the production of cephalexin using a solid phase enzyme preparation.

We have found, upon searching for acylation enzymes producing bacteria which introduce a phenylglycyl group to an amino group in 7-ADCA, microorganisms belonging to genus *Achromobacter*, herein referred to B-402-2, genus *Alcaligenes*, genus *Flavobacterium*, genus *Bacillus* and genus *Beneckea* have shown a strong acylating activity for amino group in 7-ADCA and cephalexin was almost quantitatively produced from 7-ADCA and phenylglycine ester.

B-402-2 has been deposited at the United States Department of Agriculture, Agricultural Research Service, Northern Utilization Research and Development Division, and added to its permanent culture collection as deposit number NRRL B-5393.

The taxonomical properties of the strain B-402-2 are as follows.

a. Observation on bouillon agar slant culture at 30° C. for 24 hours.
  1. Shape and size of bacterial cell: short rod, round edge. 0.5–0.8 × 2.0–2.5 $\mu$.
  2. Form of cell: almost single cell, slightly chained, no membrane.
  3. Mobility: none.
  4. Spore: none.
  5. Gram's stain: negative.
  6. Acid fastness: negative.
b. Growth on several media.
  1. Bouillon agar plate (at 30° C., 24 hours) : good growth, raised convex, no spread, white or light yellow, lustrous, soft, wet, semitransparent, no change of color of medium.
  2. Bouillon agar slant (at 30° C., 24 hours): good growth, smooth surface, no spread, lustrous, wet, milky white colony, semitransparent, no change of color of medium.
  3. Bouillon broth (at 30° C., 2 days): good growth, uniformly turbid, no precipitation, no formation of membrane, no pigmentation.
  4. Bouillon gelatin stab: surface growth along with stab line until half depth, no liquefaction of gelatine.
  5. Soy bean agar slant (30° C., at 24 hours): good growth, white or light yellow colony, smooth and soft surface semitransparent, no change of color of medium.
  6. Potato agar (30° C., 5 days): good growth, milky white colony, smooth and soft surface, raised convex, no change of color of medium.
  7. Litmus milk: acid, peptonization.
c. Physiological properties:
  1. Nitrate reduction: negative.
  2. Denitrate reaction: negative.
  3. MR test: negative.
  4. VP test: negative.
  5. Indole formation: slight formation.
  6. Hydrogen sulfate formation: positive.
  7. Starch hydrolysis: positive.
  8. Utilization of citrate: positive (strong).
  9. Utilization of inorganic nitrogen source: nitrate and ammonium salt utilization.
  10. Pigment formation: none.
  11. Urease: positive (weak).
  12. Oxidase: positive.
  13. Catalase: positive.
  14. Growth range: growth pH: 5–9.
    Optimum growth pH: 7–8
    Growth temperature: 7°–40° C.
    Optimum temperature: 24°–30° C.
  15. Aerob or anaerob: aerobic.
  16. O-F test: O-type.
  17. Fermentation of carbohydrate:

|  | Acid Formation | Gas Formation |
|---|---|---|
| L-arabinose | − | − |
| D-xylose | − | − |
| D-glucose | − | − |
| D-mannose | + | − |
| D-fructose | − | − |
| D-galactose | − | − |
| Maltose | − | − |
| Sucrose | − | − |

| | | |
|---|---|---|
| Lactose | – | – |
| Trehalose | – | – |
| D-sorbitol | – | – |
| Inositol | – | – |
| Glycerin | – | – |
| Starch | – | – |
| Rhamnose | – | – |
| Ribose | – | – |
| Ceroliose | – | – |
| Raffinose | – | – |
| Meletitose | – | – |
| Inuline | – | – |
| Saricine | – | – |
| Glucit | – | – |

Referring to the Bergey's Manual of Determinative Bacteriology 7th Edition, the taxonomical position of the strain B–402–2 hereinabove is determined belonging to genus *Achromobacter* due to no decomposition of agar, no pigment formation and acid on litmus milk. Further, it resembles *Achromobacter parvulus* because of no mobility and no acid formation from glucose. However, it is differentiated therefrom by the following points:

| | Strain B–402–2 | *Achromobacter parvulus* |
|---|---|---|
| Indole formation | slight formation | no formation |
| Starch hydrolysis | positive | negative |
| Nitrate reduction | negative | positive |

Therefore the strain B–402–2 may be a different species from *Achromobacter parvulus* and hence we refer to *Achromobacter* B–402–2 as a new species. This strain has also been deposited in the Institute for Microbiological Industry and Technology, Agency of Industrial Science and Technology, of Japan, and added to its permanent culture collection as deposit number FERM–P No. 1095.

Further embodiments of microbial species which can be used for the production of cephalexin in the present invention are, for example, as follows:

*Alcaligenes faecalis* ATCC 8750
*Achromobacter aceris* IFO 3320 (NRRL B–5391)
*Achromobacter liquidum* IFO 3084 (NRRL B–5392)
*Flavobacterium aquatile* IFO 3772 (NRRL B–5394)
*Flavobacterium capsulatum* IFO 12533 (ATCC 14666)
*Beneckea hyperoptica* ATCC 15803

The hereinabove described microbial strains or the enzyme preparations thereof have a specific activity on cephalexin and have an ability to produce almost quantitatively cephalexin from 7-ADCA and D-phenylglycine.

In accordance with the conditions employed, the said enzyme preparations have an activity to cleave the amide linkage in cephalexin to produce 7-ADCA; however, they have almost no activity on D-phenylacetamide-desacetoxy cephalosporanic acid. No acylating enzyme having specific activity as to acylation of the amino group in 7-ADCA has been previously reported.

The 7-ADCA used in this invention is produced by any method known to the prior art, for example, production from cephalosporin C (U.S. Pat. No. 3,124,576), production from 7-amino-cephalosporanic acid (U.S. Pat. No. 3,124,576), preparation from 7-phenoxyacetamide- or 7-phenylacetamide-desacetoxy cephalosporanic acid ester (U.S. Pat. No. 3,275,626), or enzymatic deacylation of 7-acylamino desacetoxy cephalosporanic acid (U.S. application, Ser. No. 235,085, filed Mar. 17, 1972).

In order to introduce a phenylglycycl group into an amino group in 7-ADCA, D-phenylglycine or a derivative thereof is used.

Examples of the said derivatives are D-phenylglycine amide, D-phenylglycylglycine, D-phenylglycylleucine, D-phenyl-glycylalanine, D-phenylglycine methyl ester, D-phenylglycine ethyl ester or the like. Among these derivatives, D-phenylglycine methyl ester, D-phenylglycine ethyl ester or the like may preferably be provided, and the most preferable derivative is a D-phenylglycine methyl ester. In the case of water insoluble derivatives thereof, a water soluble acid addition salt which does not inhibit the acylating enzyme reaction may be used.

The acylation enzyme-producing microorganism used in the present invention can be prepared by aerobic cultivation with a nutrient medium containing organic or inorganic nitrogen sources such as peptone, meat extract, corn steep liquor, yeast extract, dry yeast, soy bean protein hydrolysates, soy bean extract, nitrate, ammonium salt or the like, a carbon source such as molasses, glucose, starch hydrolysate or the like and inorganic salts, and if desired other suitable growth stimulating substances, at 20°–35° C., for 12–48 hours. For industrial production, submerged aerobic cultivation is generally used.

The acylating enzyme for the amino group in 7-ADCA may generally be present as an endo-enzyme. As for the enzyme preparations microbial cultures, natural bacterial cells collected after cultivation, or suspensions thereof may be used in the enzyme reaction.

Furthermore, microbial cells may be used which have been treated by chemical or physical procedures such as for example, acetone-, methanol- or ethanol-dried cells; spray dried cells; ground or sonically comminuted cells; cell-lysates by buffer solution or cetyl pyridinium chloride; refined enzymes obtained by known separation and refining procedures such as salting-out, fractionation precipitation, dialysis, adsorption chromatography, ion-exchange chromatography or gel-filtration of comminuted cells or cell-lysates; and the solid phase enzyme preparations or the insolublized enzymes prepared from adsorption of the acylation enzyme or producing microorganisms thereof on an inert carrier, which is not inactive for substrates and does not inactivate the acylating enzyme activity.

The acylation process may generally proceed by the reaction of 7-ADCA and phenylglycine or a derivative thereof with the acylating enzyme preparations. Usually used is a free acid of 7-ADCA at a concentration of 0.1–20 mg./ml., preferably 2–5 mg./ml. D-phenylglycine does not act as a substrate in its free acid form, and therefore an active derivative thereof may be used, such as its acid-amide or lower alcohol ester, preferably methyl ester. Generally, the phenylglycine derivative is used in a quantity of 2–20 molar excess for 7-ADCA; however, the molar ratio may be changed according to the concentration of 7-ADCA in the reaction mixture. The most preferable quantity is 6–10 molar excess. The reaction temperature may be generally 20°–45° C., preferably 30°–37° C. Any stationary, shaking or agitating culture technique can be used. The pH of the reaction mixture may be maintained at pH 5.5–7.5, optimally 6.0–6.5. Reaction time may be varied, in accordance with reaction conditions, within 0.5–3 hours, and it may be terminated when the highest production of cephalexin is achieved.

In case of the acylation process with solid phase enzyme preparation, first the acylating enzyme or the producing microorganism thereof is adsorbed on the carrier. When the example is an exo-enzyme, the acylation enzyme can be adsorbed by adding the culture filtrate of the acylation enzyme-producing strain on the carrier. In the case of an endo-enzyme, natural microbial cells collected from cultures of acylation enzyme-producing microorganisms or acetone- or ethanol-dried cells are adsorbed on the carrier, or a solution of acylating enzyme extracted from microbial cells is adsorbed on the carrier.

The carriers used in the present invention, which can be varied according to the kind of microorganisms, or in accordance with the preparation of acylation enzyme or microbial cells, are selected by considering the characteristics of the carriers adsorbing the enzyme or microbial cells which do not inactivate the acylating enzyme activity; the properties which do not remove the adsorbed enzyme or microbial cells by washing; and the property of being inactive for each substrate and not adsorbing the resulting product cephalexin. Examples which advantageously used are, when adsorbing an aqueous enzyme solution, active alumina, diatomaceous earth, acid clay, active clay, kaolin, calcium phosphate, hydroxyapatite or the like. To adsorb the microbial cells, CM-cellulose, CM-sephadex, DEAE-cellulose, TEAE-cellulose, diatomaceous earth or the like is advantageously used.

It is best to control pH so as to achieve a stable pH of the acylating enzyme when adsorbing the enzyme on the carrier. Adsorption operations can be carried out batch-wise or in a column. A column is preferable for continous enzyme reaction. Amount of carrier may vary, as well as the amount of microbial cells, volume of culture filtrates, enzyme potency or adsorption ratio of the carrier. Generally, in batch type adsorption, the amount of carrier may be 5–15 w/v% for culture filtrates, or 5–20 excess volumes for natural cells. As for the column type operation, a column packed with carrier is wetted with water, or buffer solution at the optimum pH of the enzyme, passing through the cultured broth or enzyme solution, washing the said column with water or buffer solution thereafter, to obtain the column type solid phase enzyme preparation.

The carrier adsorbing the acylating enzyme or microbial cells, that is, the solid phase enzyme preparation, may have a tendency to denature or lose its activity, and therefore it should be kept wet.

Further 7-ADCA is reacted with phenylglycine or a derivative thereof in the presence of the solid phase enzyme preparations. Although the concentration of the substrate may vary, mainly according to enzyme potency or effluent rate through the column, it should preferably be determined so as not to increase the quantity of unreacted 7-ADCA and phenylglycine in the effluent. Generally, the concentration of 7-ADCA is 0.1–2 w/v %, preferably 0.2–1 w/v %, and of phenylglycine or derivative thereof is 2–10 molar excess as compared with 7-ADCA. Acylating reaction should be carried out at optimum pH and temperature with regard to the enzyme activity. Reaction time in the case of a column-type operation can be adjusted by changing the effluent volume of substrate. Usually the reaction may be performed within a column of solid phase enzyme preparation, and continuous operation can easily be carried by continuously adding substrate. If, however, the substrate is found in the effluent, the effluent rate should be slowed down or the effluent should be recycled through the column. When the activity of the enzyme is decreased or lost, the operation should be terminated.

The thus-produced cephalexin is separated by known isolation procedures. For example, the reaction mixture is passed through anion-exchange resin or active carbon, eluting with aqueous acid solution or organic solvent-water mixture thereafter, concentrating the effluent containing cephalexin to precipitate the product isoelectrically. Or the reaction mixture is adjusted to pH 1 by adding trifluoroactic acid, thereafter extracting with organic solvent such as methylisobutyl ketone, thereby precipitating isoelectrically after dissolving in acidic water. Further, the reaction mixture is treated with anion-exchange resin in the presence of water-immiscible organic solvent and concentrating or freeze-drying the aqueous layer to isolate the cephalexin as a free acid.

Assay of Cephalexin

A test solution containing cephalexin is microbiologically assayed by the paper-disc method or cup method with *Bacillus subtilis* PCI-219 for 16 hours at 37° C. The resulting inhibition zone is measured whereby the potency of cephalexin is calculated by the standard curve of cephalexin.

In order to permit those having ordinary skill in this art to practice the invention, the following illustrative examples are given:

EXAMPLE 1

One hundred milliliters of water (pH 7.0) containing glucose 3 percent, yeast extract 1 percent, $K_2HPO_4$ 0.1 percent, $MgSo_4 \cdot 7H_2O$ 0.05 percent, KCl 0.05 percent and $FeSO_4$ 0.001 percent were sterilized at 120° C., for 20 minutes.

*Achromobacter* B–402–2 NRRL B–5393 was inoculated therein and reciprocally shake cultured at 26° C. for 72 hours. The cultured medium was adjusted to pH 6.5, then 100 ml. of 0.1 mole phosphate buffer (pH 6.5) containing 2 mg./ml. of 7-ADCA and 20 mg./ml. of D-phenylglycine methyl ester hydrochloride were added therein, thereafter reacted enzymatically at 37° C. for 3 hours. Cephalexin was assayed in the reaction filtrate at a yield of 100 percent. The said filtrate was spotted on a silica-gel thin layer chromatography plate containing fluorescence and developed by a solvent system of n-butanol:acetic acid:water (3:1:1). Observation by ultraviolet lamp at 2,536 A shows a red-purple spot substantially at Rf 0.50 which was also identical with the bioassayed pattern of an authentic sample.

EXAMPLE 2

Example 1 was repeated except that microorganisms illustrated in the following table were used instead of *Achromobacter* B—402–2 NRRL B–5393 to obtain the results hereinbelow.

| Strain | Cephalexin Formed (%) |
|---|---|
| *Alcaligenes faecalis* ATCC 8750 | 15 |
| *Flavobacterium aquatile* NRRL B–5394 | 24 |
| *Beneckea hyperoptica* ATCC 15803 | 100 |

Example 3

1.3 l. of water (pH 7.0) containing glucose 3 percent, yeast extract 1 percent, $K_2HPO_4$ 0.1 percent, $MgSo_4 \cdot 7H_2O$ 0.05 percent, KCl 0.05 percent and $FeSO_4$ 0.001 percent, sterilized at 120° C. for 20 minutes, was divided aseptically into 100 ml. portions each in a 500 ml. flask, inoculated with a strain of *Achromobacter* B–402–2 and reciprocally shake cultured at 26° C. for 72 hours. 1 l. of cultured broth was centrifuged and the thus obtained wet natural cells were twice washed with physiological saline, then suspended in 1.2 l. of 0.1 mole phosphate buffer solution (pH 6.5). To this suspension was added 400 ml. of water containing 5 mg./ml. of 7-ADCA and 50 mg./ml. of D-phenylglycine methyl ester hydrochloride, and the mixture was incubated at 37° C. for 2 hours. Cephalexin was assayed in the reaction mixture at a yield of 98.8 percent.

EXAMPLE 4

Example 3 was repeated except that the microorganisms hereinbelow illustrated were used instead of *Achromobacter* B–402–2 NRRL B–5393 to obtain the result shown in the following table.

| Strain | Cephalexin Formed (%) |
| --- | --- |
| *Alcaligenes faecalic* ATCC 8750 | 15 |
| *Flavobacterium aquatile* NRRL B–5394 | 23 |
| *Beneckea hyperoptica* ATCC 15803 | 99 |

EXAMPLE 5

To water (pH 7.0) containing glucose 3 percent, yeast extract 1 percent, $K_2HPO_4$ 0.1 percent, $MgSO_4 \cdot 7H_2O$ 0.05 percent, KCl 0.05 percent and $FeSO_4$ 0.001 percent was inoculated a strain of *Beneckea hyperoptica* ATCC 15803, and reciprocally shake cultured at 26° C. or 72 hours. 1 l. of the cultured broth was centrifuged and the collected natural wet cells were twice washed with physiological saline, thereafter centrigued and suspended in 1 l. of distilled water. 8 l. of acetone was added therein to obtain acetone powdered cells. 165 mg. of the said acetone powder was suspended in 5 ml. of 0.1 M phosphate buffer solution (pH 6.5), adding an aqueous solution of 2 ml. of 7-ADCA (5 mg./ml.) and 2 ml. of D-phenylglycine methyl ester hydrochloride (50 mg./ml.), 0.1 M phosphate buffer solution (pH 6.5) to make 100 ml. of a reaction mixture, and incubated at 37° C. for 90 minutes. Quantitative assay of cephalexin produced in the resulting reaction mixture was 90.5 percent.

EXAMPLE 6

Five hundred mg. of acetone-powdered cells of *Achromobacter* B–402–2 NRRL B–5393 obtained by the same procedure as in Example 3 was suspended in 100 ml. of 0.1 M phosphate buffer solution (pH 6.5). To this suspension was added 50 ml. of aqueous solution of 7-ADCA (4 mg./ml.) and 50 ml. of aqueous solution of D-phenylglycine methyl ester (20 mg./ml.) After incubation at 37° C. for 2 hours, the reaction mixture was centrifuged to obtain a supernatant containing 1,260 γ/ml. of cephalexin, acylation ratio 80.3 percent. The supernatant was charged on a column (2 × 20 cm.) of anion-exchange resin Dowex 2 (acetate form) (product of Dow Chemical Co., U.S.A.); after washing with water, 400 ml. of passed solution was adjusted to pH 8.0, and again charged on a column (2 × 15 cm.) of anion-exchange resin Dowex 2 (acetate form), eluted with 0.05 M of acetic acid thereafter. Each fraction (about 15 ml.) was checked by thin layer chromatography, collecting the fractions containing cephalexin to obtain 490 mg. of freeze-dried powder of cephalexin. The said powder was assayed as 60 percent pure by ultraviolet absorption spectrum method. This dried powder was purified by isoelectric precipitation to obtain 294 mg. of white powder. (Yield 90 percent, purity 98 percent, overall yield 88 percent).

EXAMPLE 7

A. 20 l. of water (pH 7.0) containing glucose 3 percent, yeast extract 1 percent, $K_2HPO_4$ 0.1 percent, $MgSO_4 \cdot 7H_2O$ 0.05 percent, KCl 0.05 percent and $FeSO_4$ 0.001 percent was introduced into a 30 l. jar fermenter, sterilized at 120° C. for 20 minutes and therein was aseptically inoculated 400 ml. of the seed culture, previously cultured in the same medium, of *Achromobacter* B–402–2 NRRL B–5393, and aerobically cultured at an aeration of 20 l./min., agitation 300 r.p.m., at 26° C. for 72 hours. After fermentation, bacterial cells were collected by centrifugation, and washed twice with physiological saline to obtain 170 g. of wet natural cells.

B. 3 g. of natural cells obtained in (A) hereinabove was suspended in 100 ml. of 0.1 M of acetate buffer solution (pH 6.0). This suspension was added to 180 g. of DEAE-cellulose in 1.5 l. of 0.1 M acetate buffer solution at 0° C. with stirring. After 6 hours standing the solid phase enzyme preparation was obtained. The said enzyme preparation was packed into a column (3.5 × 47.5 cm.), washed with 0.1 M acetate buffer solution (pH 6.0) thereafter, and then 12 l. of 0.1 M acetate buffer solution (pH 6.0) containing 7-ADCA 0.1 percent and D-phenylglycine methyl ester hydrochloride 0.5 percent was passed through within 24 hours. The thus-obtained 12 l. of eluate was passed through a column of 120 g. of active charcoal (7.2 × 13 cm.) to adsorb the cephalexin, washed with water and eluted with a solvent mixture acetone- 0.5N acetic acid (1:1) thereafter. 1 l. of active fractions containing cephalexin was concentrated in vacuo and the residue was recrystallized with a mixture of water and acetonitrile to separate the cephalexin which was washed with warm water and dried to obtain 12.3 g. (yield 60 percent) of crystal. The product was showed a single spot by an assay of silica gel thin layer chromatography. NMR shows showed the identity of both compounds. Purity: 90 percent assayed by bioautography and ultraviolet absorption method.

EXAMPLE 8

40 g. of natural cells obtained in the procedure of Example 7 (A) was suspended in 30 ml. of distilled water and 1 l. of acetone was added to obtain 10 g. of acetone-dried cells by filtration. 160 mg. of dried cells of *Achromobacter* B–402–2 NRRL B–5393 suspended in 4 ml. of 0.1 M acetate buffer solution (pH 6.0) was added in 10 g. of DEAE cellulose in 20 ml. of 0.1 M acetate buffer (pH 6.0) with stirring. After standing for 6 hours, the said carrier, with microbial cells, i.e. the solid phase enzyme preparation, adsorbed thereto, was packed in a column (1 × 26 cm.), washed with 0.1 M acetate buffer solution (pH 6.0), and 100 ml. of 0.1 M acetate buffer solution (pH 6.0) containing 7-ADCA 0.1 percent and D-phenylglycine methyl ester hydrochloride 0.5 percent were passed thereto within 5 hours. Acylation ratio assayed as cephalexin in the eluate was 85 percent.

EXAMPLE 9

Example 8 was repeated except that the following carriers were used instead of DEAE cellulose to prepare cephalexin.

| Carrier | Cephalexin Formed (%) |
|---|---|
| CM–cellulose | 40 |
| TEAE-cellulose | 80 |

EXAMPLE 10

To a suspension of 4 g. of dried cells of Achromobacter B-402-2 obtained in Example 8 in 500 ml. of 0.1 M acetate buffer solution (pH 6.0) was added 50 mg. of lyzozyme and incubated at 37° C. for 60 hours. 2 mg. of desoxyribonuclease were added and the suspension was further incubated for 10 minutes. The reaction mixture was centrifuged and 10 g. of hydroxyapatite was added in 200 ml. of the supernatant, and the mixture was thereafter left to stand for 1 hour. The solid phase enzyme preparation was packed in a column, and the enzyme reaction was carried out as in Example 8, with 90 percent cephalexin formation observed.

EXAMPLE 11

1.3 l. of water (pH 7.0) containing polypeptone 1 percent, meat extract 1 percent and NaCl 0.5 percent, sterilized at 120° C. for 20 minutes, was divided into 100 ml. portions each in a 500 ml. flask. Bacillus megaterium NRRL B-5385 was inoculated in each medium portion and cultured at 30° C. for 48 hours. After cultivation, bacterial cells were removed and 1 l. of the filtrate was adjusted to pH 6. 10 g. of Celite (product of Johns-Manville Sales Co., U.S.A.) were added thereto and stirred for about 30 minutes. The enzyme preparation was packed in a column (1 cm. diameter), washed with 0.1 M phosphate buffer solution (pH 7.0), then 100 ml. of 0.1 M phosphate buffer solution (pH 7.0) containing 7-ADCA 0.1 percent and D-phenylglycine methyl ester hydrochloride 1 percent was passed within 5 hours. 100 ml. of eluate was obtained and the cephalexin formation ratio was 80 percent.

EXAMPLE 12

Each of three 100 ml. portions of water containing glucose 3 percent, yeast extract 1 percent, $K_2HPO_4$ 0.1 percent, $MgSO_4\cdot 7H_2O$ 0.05 percent, KCl 0.05 percent and $FeSo_4$ 0.001 percent was sterilized at 120° C. for 20 minutes. After cooling, Alcaligenes faecalis ATCC 8750, Flavobacterium aquatile NRRL B-5394 and Beneckea hyperoptica ATCC 15803 were respectively inoculated in each medium and reciprocally shake cultured at 26° C. for 72 hours. Each cultured broth was adjusted to pH 6.5, and bacterial cells collected according to the same procedures as in Example 8 to obtain from each portion 200 mg. of dried cells. Furthermore, in Example 8, dried microorganism Achromobacter B-402-2 NRRL B-5393 was replaced by each 200 mg. of the dried microbial cells obtained hereinabove to form the cephalexin of the following:

| Strain | Cephalexin Formed (%) |
|---|---|
| Alcaligenes faecalis ATCC 8750 | 18 |
| Flavobacterium aquatile NRRL B-5394 | 25 |
| Beneckea hyperoptica ATCC 15803 | 80 |

EXAMPLE 13

Six hundred l. of water (pH 7.0), containing glucose 4 percent, yeast extract 1.2 percent, $K_2HPO_4$ 0.15 percent, $MgSO_4\cdot 7H_2O$ 0.05 percent, KCl 0.05 percent and $FeSO_4$ 0.001 percent, was inoculated with 30 l. of seed culture of Achromobacter B-402-2 NRRL B-5393 and submerged cultured with aeration for 72 hours at 26° C. After fermentation, bacterial cells were collected from 570 l. of broth by centrifugation. The natural wet cells, equivalent to 970 g. of dried cells, were suspended in 27 l. of 0.1 M acetate buffer (pH 6.5), then 1.18 kg. of 7-ADCA (purity 84.8 percent) and 30 kg. of D-phenylglycine methyl hydrochloride were added thereto, and finally 0.1 M acetate buffer (pH 6.5) was added up to 200 l. l. of reaction mixture. Incubation was carried out at 37° C. for 3 hours with stirring. In the reaction mixture, 1.28 kg. of cephalexin was assayed by ultraviolet absorption spectrum (acylation ratio 80 percent). The solution was centrifuged and further filtered. To the clear solution was added 4 kg. of active charcoal and after filtration, the aqueous layer was condensed in vacuo to obtain 1.03 kg. of cephalexin (yield 64 percent, purity 98 percent).

From a consideration of the foregoing dislosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. A process for the production of cephalexin, which comprises reacting 7-amino desacetoxy cephalosporanic acid with D-phenylglycine or a derivative thereof in an aqueous medium in the presence of an amino group acylating enzyme for 7-ADCA derived from a microorganism selected from the group consisting of genus Alcaligenes, genus Achromobacter, genus Flavobacterium, genus Bacillus and genus Beneckea.

2. A process according to claim 1 wherein said micro-organism is a strain selected from the group consisting of Alcaligenes faecalis ATCC 8750, Achromobacter NRRL B-5393, Flavobacterium aquatile NRRL B-5394, Bacillus megaterium NRRL B-5385 and Beneckea hyperoptica ATCC 15803.

3. A process according to claim 1 wherein the acylating enzyme is present in a preparation selected from the group consisting of microbial cells of a strain of Alcaligenes faecalis ATCC 8750, Achromobacter NRRL B-5393, Flavobacterium aquatile NRRL B-5394, Bacillus megaterium NRRL B-5385 or Beneckea hyperoptica ATCC 15803, and cultured broth thereof.

4. A process according to claim 1 wherein the derivative of D-phenylglycine is a compound selected from the group consisting of D-phenylglycine methyl ester, D-phenylglycine ethyl ester, D-phenylglycine amide, D-phenylglycyl glycine and D-phenylglycyl leucine.

5. A process according to claim 1 wherein the acylating enzyme is an insolubilized enzyme preparation.

6. A process according to claim 5 wherein the insolubilized enzyme preparation is a carrier adsorbed with cultured broth of a microorganism selected from the group consisting of *Alcaligenes faecalis* ATCC 8750, *Achromobacter* NRRL B-5393, *Flavobacterium aquatile* NRRL B-5394, *Bacillus megaterium* NRRL B-5385 and *Beneckea hyperoptica* ATCC 15803, with microbial cells thereof or with the acylating enzyme prepared therefrom.

7. A process according to claim 6 wherein the carrier is selected from the group consisting of diatomaceous earth, acid clay, active clay, alumina, kaolin, calcium phosphate, hydroxyapatite, cellulose and carboxy methyl cross linked dextran.

8. A process according to claim 1 wherein the reaction is carried out at 20°–45° C., at pH 5.5–7.5, for 0.5–3 hours, with a concentration of 7-amino cephalosporanic acid of 0.1–20 mg./ml., and a concentration of D-phenylglycine ester in 2–20 molar excess relative to the 7-amino cephalosporanic acid.

9. A process according to claim 8 wherein the reaction is carried out at 30°–37° C., at pH 6.0–6.5, said concentration being 2–10 mg./ml. and said molar excess being 2–10.

* * * * *